Figure 1:
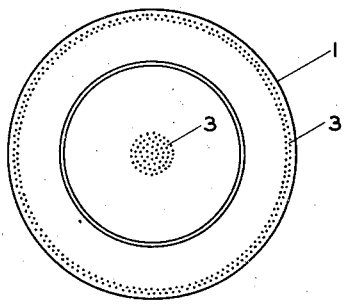

Sept. 19, 1939.　　　　R. E. GOULD　　　　2,173,107

MAKING CERAMIC ARTICLES

Filed Aug. 9, 1937　　　　2 Sheets-Sheet 1

Robert E. Gould
INVENTOR

BY Arthur L. Davis
ATTORNEY

Sept. 19, 1939.  R. E. GOULD  2,173,107
MAKING CERAMIC ARTICLES
Filed Aug. 9, 1937  2 Sheets-Sheet 2

Robert E. Gould
INVENTOR

BY Arthur L. Davis
ATTORNEY

Patented Sept. 19, 1939

2,173,107

UNITED STATES PATENT OFFICE 2,173,107

MAKING CERAMIC ARTICLES

Robert E. Gould, Norris, Tenn.

Application August 9, 1937, Serial No. 158,143

8 Claims. (Cl. 25—156)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a process of making ceramic articles, particularly flatware of china or porcelain body.

One of the objects of this invention is to produce fired ceramic flatware articles with a minimum of deformation in those zones of stress where either the influence of gravity or internal strain causes such undesirable effects. Another object of this invention is to provide a method for forming ceramic articles rapidly and with a minimum of expense in order that deformation be practically eliminated in subsequent firing. Still another object of this invention is to provide a method for making ceramic flatware articles with a minimum of deformation of the finished article where the shape of the edge of the article is other than circular. Other objects of this invention include the provision of a method for rapid and automatic mechanical formation of formed ceramic articles, a method for forming very thin ceramic articles and a method for firing a stack of a plurality of formed ceramic articles with a resulting minimum deformation in the finished articles.

Ceramic flatware is easily formed by jiggering or casting from semi-vitreous or hotel china type bodies but such articles present a difficult problem in delivering the ware straight from the firing kiln. Deformation in fired ceramic articles is caused for the most part by internal strains arising from one or more of the following sources: characteristics of the plastic body from which the articles are formed, method of forming the ceramic articles, and skill or lack of skill exhibited during the forming operation. These internal strains are subsequently evidenced, first, during the drying of the formed ceramic articles, and secondly, during the firing of the dried formed ceramic articles. Kiln placing methods, such as used in the manufacture of true porcelain, Belleek, and bone china, result in a satisfactory product but the kiln capacities are severely restricted. This latter objectionable feature might be overcome provided a kiln fill equal to or better than that obtained using semi-vitreous or hotel china type ware could be employed wherein sand, calcined kaolin and mixtures of calcined kaolin and alumina are filled in between the plates. This has not, however, been hitherto attained particularly in connection with the use of porcelain type ceramic ware. In the hitherto known methods of firing, the processes commonly used do not provide any way for bracing the centers of the ware, which have a tendency to drop if the ware is thin; the processes used do not make it possible to stack the ware to a sufficient height, say not more than 12 high; the processes used do not appear to overcome strains which are introduced into the ware during the forming operation; the processes used have a tendency to show up the internal strains after a biscuit is fired in spite of the bracing; the materials used for bracing carry an excessive amount of dust; the materials used for bracing considerably affect the translucency of the ware and have a tendency to pack and fuse into the ware; and the materials used for bracing have to be reground or otherwise treated before reuse.

I have discovered a process of making ceramic ware which provides for firing a plurality of the formed ceramic articles entirely separated from each other in the zone of greatest potential deformation by a formed unfired ceramic element. The zone of greatest potential deformation of a formed ceramic article, namely, at or adjacent to the external edge or rim, is separated from a similar zone in an adjacent article by a formed unfired ceramic ring-like element made of plastic clay of the same body or body of the same characteristics as that from which the ceramic articles are formed. Another zone of potential deformation of a formed ceramic article, namely, the center portion of the article inside its foot or equivalent position, is separated from a similar zone in an adjacent article by a formed unfired ceramic disc-like element made of plastic clay of the same body or body of the same characteristics as that from which the ceramic articles are formed or a fired ceramic disc-like element of proper thickness.

The generic invention and one specific adaptation are described and claimed in this application. Another specific adaptation is described and claimed in my copending app. Ser. No. 158,144, filed August 9, 1937, and still another adaptation is described and claimed in my co-pending app. Ser. No. 158,145, filed August 9, 1937.

Figure 3:
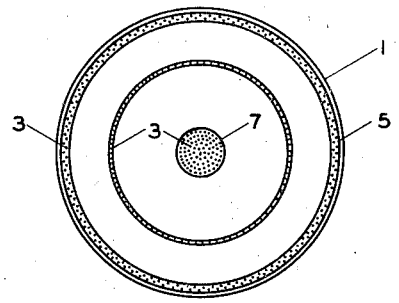
Figure 2:
Figure 4:
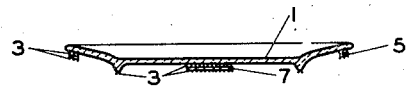
Figure 5:
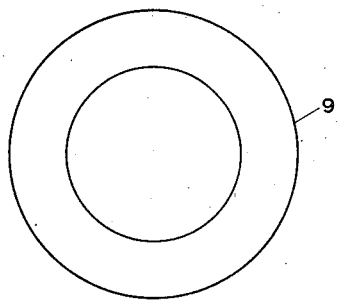
Figure 7:
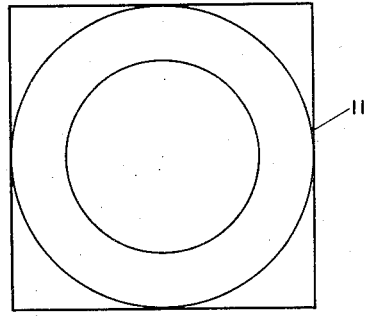
Figure 6:
Figure 8:
Figure 9:
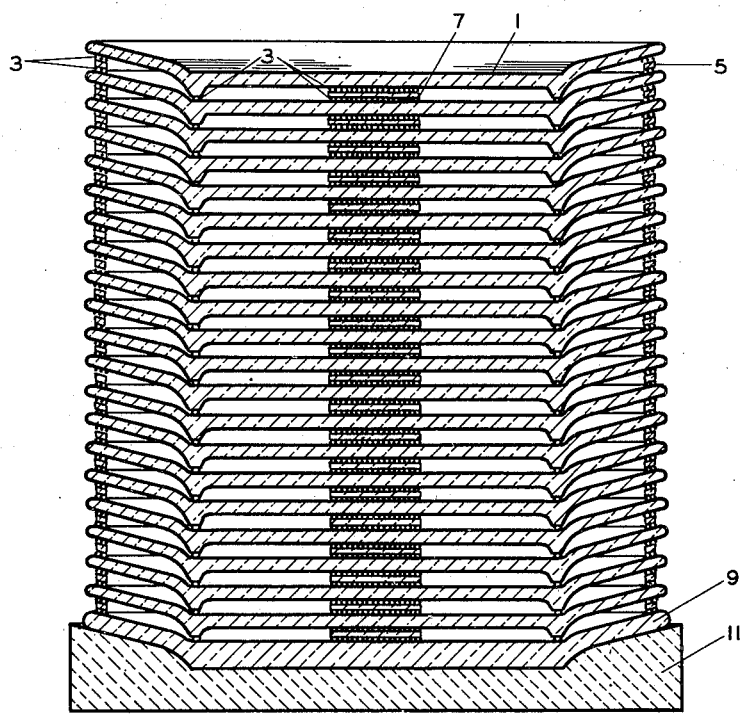

In the accompanying drawings, which form a part of the specification, and wherein reference symbols refer to like parts wherever they occur, Fig. 1 is a plan view of the reverse side of one of the formed ceramic articles after the application of finely divided refractory, Fig. 2 is a vertical sectional view of Fig. 1, Fig. 3 is a plan view of the reverse side of the ceramic article shown in Fig. 1 and Fig. 2 with overcast ring-like element and disc-like element after the application of finely divided refractory, Fig. 4 is a vertical sectional view of Fig. 3, Fig. 5 is a plan view of the obverse side of a green setter, Fig. 6 is a vertical sectional view of Fig. 5, Fig. 7 is a plan view of a fired refractory setter, Fig. 8 is a vertical sectional view of Fig. 7, Fig. 9 is a vertical sectional view of a plurality of formed ceramic articles as shown in Fig. 3 and Fig. 4 assembled on a green setter as shown in Fig. 5 and Fig. 6 resting upon a fired refractory setter as shown in Fig. 7 and Fig. 8 and ready for firing to the desired maturity.

Figure 10:
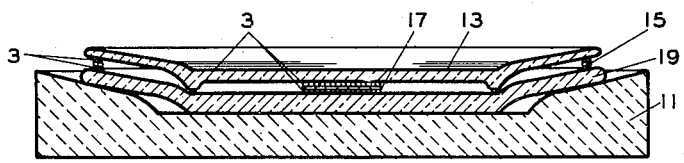

Fig. 10 is a vertical sectional view of the assembly shown in Fig. 9, after firing to the desired maturity, except that only one of the fired ceramic articles is shown.

In Fig. 1 and Fig. 2, a portion of the reverse side of a formed ceramic article 1, is coated with a finely divided refractory 3, which is neutral to the body of the ceramic article at the temperature of subsequent firing.

In Fig. 3 and Fig. 4, a ring-like element 5, and a disc-like element 7, are overcast on that portion of a formed ceramic article 1, coated by the finely divided refractory 3, with the face of the ring-like element 5, and the disc-like element 7, respectively, opposite the article also coated with the finely divided refractory 3.

In Fig. 5 and Fig. 6, a green setter 9, has at least a part of its obverse side identical in shape to the obverse side of the formed ceramic article 1.

In Fig. 7 and Fig. 8, a true shaped fired refractory setter 11, has its obverse side complementary to the reverse side of the green setter 9.

In Fig. 9, a plurality of leather hard formed ceramic articles 1, with overcast ring-like elements 5, and disc-like elements 7, as shown in Fig. 4, are assembled on a green setter 9, as shown in Fig. 6, resting on a true shaped fired refractory setter 11, as shown in Fig. 8 for firing to the desired temperature for the maturity of the articles.

In Fig. 10, a fired ceramic article 13, with fired ring-like element 15, and fired disc-like element 17, rests on fired setter 19, which rests on the original fired setter 11, with the first four elements separated by finely divided refractory 3.

It is evident that there are numerous factors which will influence conditions for the most satisfactory operation of my invention, the actual limits of which cannot be established except by a detailed study of each set of raw materials and the intermediate and finished products involved.

The ceramic flatware articles may be formed by conventional methods, such as jiggering or casting. This particular invention relates generically to the production of ceramic flatware articles with an exterior edge or rim of any desired shape, with the invention relating specifically to the production of ceramic flatware articles with a circular edge or rim.

The zones of deformation of a formed ceramic flatware article during firing are first, the center of the article at which gravity probably exerts the most predominant influence, secondly, the zone through the center line of the foot and thirdly, and by far the most important, the exterior rim of the article where deformation is caused by gravity on the one hand and marked unevenness by the effect of internal strains in the body of the formed ware on the other hand.

I have discovered that practically all deformation of ceramic flatware during firing can be eliminated by firing stacks of flatware articles with their respective zones of most serious deformation, except the foot, separated by unfired ceramic elements made of plastic clay of substantially the same characteristics as the body of the articles. Since the zone of most serious deformation lies at the rim of the formed ceramic article, the ceramic ring-like element used in this zone is of the most importance. Generically, these individual ceramic ring-like elements may be formed in any suitable manner, such as by jiggering or casting. Specifically, these individual ceramic ring-like elements may be formed in connection with making circular ceramic articles by coating a zone on the reverse side of the formed ceramic article with a fluid suspension of a finely divided refractory, such as alumina finer than 150 mesh, which is neutral to the body of the ceramic article at the temperature of subsequent firing and by overcasting the portion so coated with a ceramic element in the form of a ring with the thickness of the ring such that the face away from the formed ceramic article is complementary to that portion of the obverse of another formed ceramic article identically prepared and upon which it is subsequently placed prior to firing.

The ceramic element may be overcast on the reverse side of the article by placing on that side a plaster cast having two holes for admitting slip to the opposite sides of the ring and two holes midway between the points for the admission of slip and for its efflux. A fast casting type slip with a viscosity as measured by the flow of 250 cc. from an open top Mariotte tube not to exceed 45 seconds is admitted simultaneously into the two holes provided for charging until the slip overflows from the two holes provided for its efflux. It is necessary that the slip be kept agitated at all times and preferable to keep the slip at a temperature between 90 and 100° F. After approximately 10 minutes the plaster ring mold is easily removed and the surface of the ring made true, particularly with respect to the locations for admission and efflux of the slip.

Since the other zone of deformation, namely, that of the center of the article, ordinarily requires another ceramic element to be placed beneath it so as to separate it from the article immediately below it, it is necessary to supply a ceramic element for this purpose. This second ceramic element may be of any suitable shape, preferably in the form of a disc. The ceramic disc-like elements used to separate the formed ceramic articles may be formed in a manner substantially identical to the method of the formation of the ceramic ring-like elements except in respect to their location and shape. It is preferable, however, to either use the ceramic disc-like element over again after firing and separate it from the fired ceramic article or to prepare separately the individual ceramic disc-like elements which, when fired, correspond in thickness to the distance between the bottom of one fired ceramic article and the top of the fired ceramic article immediately beneath.

It is necessary to separate all of the unfired ceramic elements whether they be articles proper or separating elements from each other by the use of a finely divided refractory which is substantially neutral to the body from which these elements are made at the temperature of subsequent firing. A finely divided alumina, such as alumina finer than 150 mesh, is probably the most suitable for this purpose. Where the separating elements are overcast, the separation is accomplished by first painting the portion to be overcast by a finely divided suspension of the refractory. The other unfired parts may be separated either by painting the contact areas with the finely divided suspension or dusting these areas with finely divided alumina. These areas include not only the contact areas between the parting elements and the articles proper but the foot of each ceramic article where it contacts the obverse of the ceramic article immediately below it. The layers of finely divided refractory shown in the drawings are necessarily out of proportion in respect to the other elements since it would not be possible otherwise to show the presence and location of the refractory.

It has been found desirable to use a formed unfired setter which has at least a portion of its obverse side identical in shape to the obverse side of the formed unfired ceramic article. This is preferable in order that an assembly of unfired elements as subsequently described may be prepared and a uniform shrinkage of all the elements obtained during firing.

The formed ceramic articles, the formed ceramic ring-like separating elements, the formed ceramic disc-like separating elements and the formed setter are dried to leather hardness so that the primary shrinkage has already taken place and any subsequent slight flexing may take place without undue distortion.

A true shaped fired refractory setter with its obverse side complementary to the reverse side of the unfired setter is provided as a base for assembling a stack of unfired elements.

A stack of the unfired elements is prepared for drying and firing by placing a fresh leather hard unfired setter on a true shaped fired refractory setter and by building up a plurality of the leather hard ceramic articles, each separated by two ceramic elements, in substantially vertical alignment, with the bottom article in accurate horizontal and vertical alignment with the obverse of the unfired setter. It has been found possible to assemble much more than the usual number of ceramic articles in this manner for firing. Ordinarily the number may range from 18 to 36 articles, depending upon the size and shape of the article.

The assembly is fired under conditions of temperature, time and atmosphere to obtain a desired maturity. During the firing, there is an appreciable shrinkage of all of the original unfired elements of the assembly, with this shrinkage varying considerably with the plastic material from which the articles are formed. It may, for example, vary from 8 to 18%.

After firing, the assembly is dismantled and those separating elements which adhere to the fired ceramic articles removed. The coating of the finely divided refractory adhering to the fired ceramic articles is also removed from the articles.

Certain terms used throughout the description and claims are understood to have the following meaning: "obverse side" refers to the top of the article or element as assembled for firing regardless of how the article or element is actually formed and likewise "reverse side" refers to the bottom of the article or element as assembled for firing regardless of how the article or element is actually formed.

It will be seen, therefore, that this invention actually may be carried out by the modification of certain details without departing from its spirit or scope.

I claim:

1. In a process of making a plurality of ceramic flatware articles, which have substantially identical dimensions, the steps which comprise superposing for subsequent firing a plurality of ceramic elements comprising a plurality of leather hard ceramic articles, preformed from plastic material, a leather hard ceramic separating element, preformed from the plastic material from which the ceramic articles are formed, supporting each ceramic article in the zone of greatest potential deformation during firing, a leather hard setter, preformed from the plastic material from which the ceramic articles are formed, with at least a part of the obverse of the setter substantially identical to the obverse of the leather hard ceramic articles, and a fired refractory setter, with the obverse of the fired setter complementary to the reverse of the leather hard setter.

2. In a process of making a plurality of ceramic flatware articles, which have substantially identical dimensions, the steps which comprise superposing for subsequent firing a plurality of ceramic elements comprising a plurality of leather hard ceramic articles, preformed from plastic material, a leather hard ceramic separating element, preformed from a plastic material which has substantially the same physical properties as the plastic material from which the ceramic articles are formed, supporting each ceramic article in the zone of greatest potential deformation during firing, a leather hard setter, preformed from a plastic material which has substantially the same physical properties as the plastic material from which the ceramic articles are formed with at least a part of the obverse of the setter substantially identical to the obverse of the leather hard ceramic articles, and a fired refractory setter, with the obverse of the fired setter complementary to the reverse of the leather hard setter.

3. The process according to claim 1, wherein the said leather hard separating element is in the form of a ring, which is so shaped that the opposite faces of the separating element fit, respectively, the obverse of one ceramic article and the reverse of a superposed ceramic article adjacent to the edge of the ceramic articles.

4. The process according to claim 2, wherein the said leather hard separating element is in the form of a ring, which is so shaped that the opposite faces of the separating element fit, respectively, the obverse of one ceramic article and the reverse of a superposed ceramic article adjacent to the edges of the ceramic articles.

5. The process according to claim 1, wherein the said leather hard separating element is in the form of a ring, which is so shaped that the opposite faces of the separating element fit, respectively, the obverse of one ceramic article and the reverse of a superposed ceramic article adjacent to the edges of the ceramic articles, and another leather hard separating element is in the form of a disc, subjacent to each ceramic article, preformed from the plastic material from which the ceramic articles are formed and so shaped that the opposite faces fit, respectively, the obverse of one ceramic article and the reverse of a superposed ceramic article at approximately the center of the articles.

6. The process according to claim 2, wherein the said leather hard element is in the form of a ring, which is so shaped that the opposite faces of the separating element fit, respectively, the obverse of one ceramic article and the reverse of a superposed ceramic article adjacent to the edges of the ceramic articles, and another leather hard separating element is in the form of a disc, subjacent to each ceramic article, preformed from a plastic material which has substantially the same physical properties as the plastic material from which the ceramic articles are formed and so shaped that the opposite faces fit, respectively, the obverse of one ceramic article and the reverse of a superposed ceramic article at approximately the center of the articles.

7. The process according to claim 1, wherein the reverse of each ceramic article adjacent to its edge is coated with a finely divided refractory neutral to the body of the article at the temperature of subsequent firing, and the separating element is overcast in the form of a ring on the coated portion of the article and so shaped that the element fits the obverse of a subadjacent ceramic article.

8. The process according to claim 1, wherein the reverse of each ceramic article adjacent to its edge and at approximately the center of the article respectively is coated with a finely divided refractory neutral to the body of the article at the temperature of subsequent firing, and the separating element is overcast in the form of a ring on the coated portion of the article adjacent to its edge, and another separating element is overcast in the form of a disk on the centrally coated portion of the article, both separating elements so shaped that the lower faces of the elements fit the obverse of a subadjacent ceramic article.

ROBERT E. GOULD.